Nov. 4, 1947.　　　M. E. BUTLER　　　2,430,387
REMOTE ELECTRIC METERING DEVICE
Filed April 23, 1946　　2 Sheets-Sheet 1
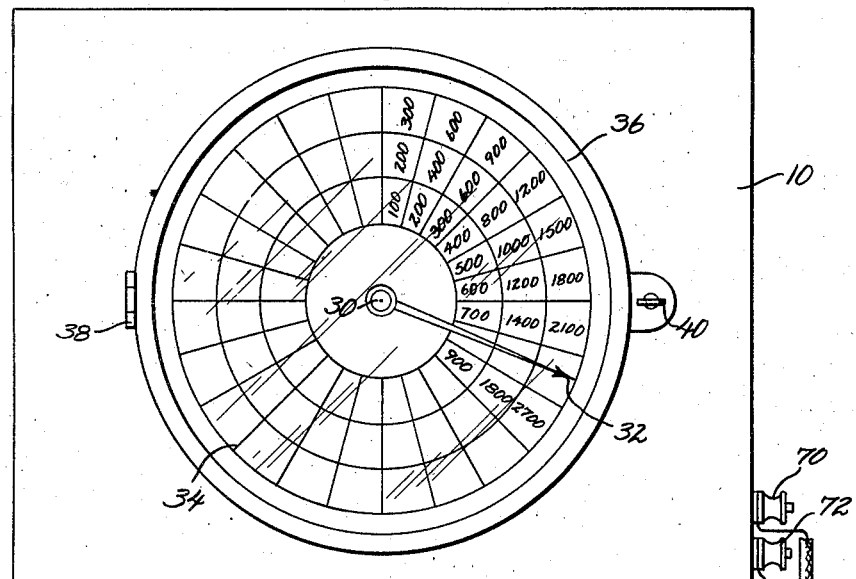
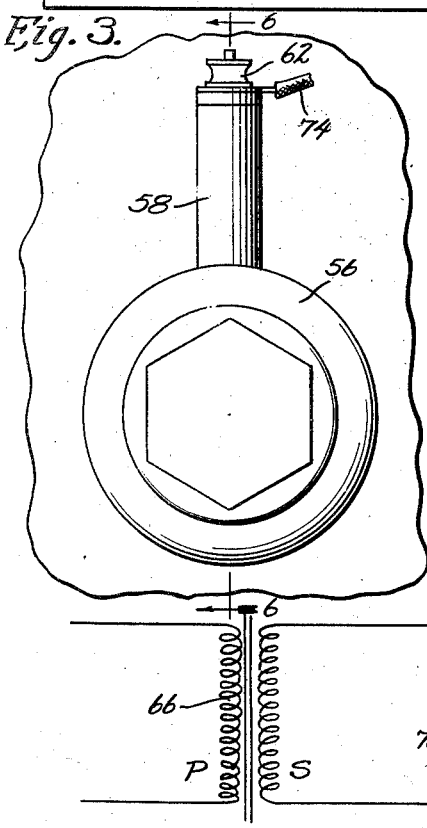
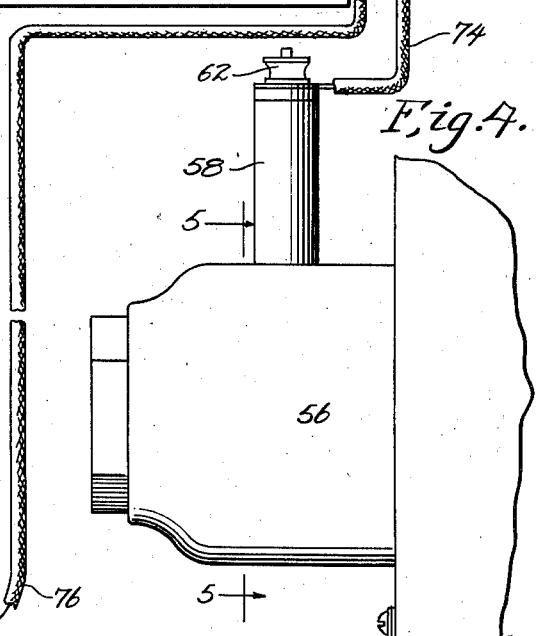
INVENTOR.
Marshall E. Butler,
BY Victor J. Evans & Co.
ATTORNEYS Nov. 4, 1947.   M. E. BUTLER   2,430,387
REMOTE ELECTRIC METERING DEVICE
Filed April 23, 1946   2 Sheets-Sheet 2

INVENTOR.
Marshall E. Butler,
BY Victor J. Evans & Co.
ATTORNEYS

Patented Nov. 4, 1947

2,430,387

UNITED STATES PATENT OFFICE 2,430,387

REMOTE ELECTRIC METERING DEVICE

Marshall E. Butler, Raleigh, N. C.

Application April 23, 1946, Serial No. 664,147

1 Claim. (Cl. 177—328)

This invention appertains to improvements in electric metering devices, or systems, for registering the discharge, or feed, of fluent materials, liquid, granular, or pulverulent, at a distance remote from the point of such discharge or feed.

The primary object of the invention is to provide a comparatively simple and inexpensive, but highly efficient, device, or system, of this character, particularly one for accurately registering, at a distance, coal fed by a mechanical stoker to a furnace, or furnaces, industrial or domestic, so that the operator, engineer or householder, will be kept informed, daily and at all times, of the amount of fuel consumed and, consequently, the amount remaining available for use.

With the foregoing and other objects and advantages in view, the invention resides in the certain new and useful combination, construction, and arrangement of parts and circuits, as will be hereinafter more fully described, set forth in the appended claim, and illustrated in the accompanying drawings, in which:

Figure 1 is a face view of the meter or register casing and showing a hinged sight window for the exposure therethrough of the calibrated dial card, the window opening being closed with a transparency;

Figure 3 is a fragmentary end view of a mechanical stoker of the "Iron Fireman" type, and showing the means for making a circuit connection therewith;

Figure 4 is a side view of Figure 3;

Figure 2:
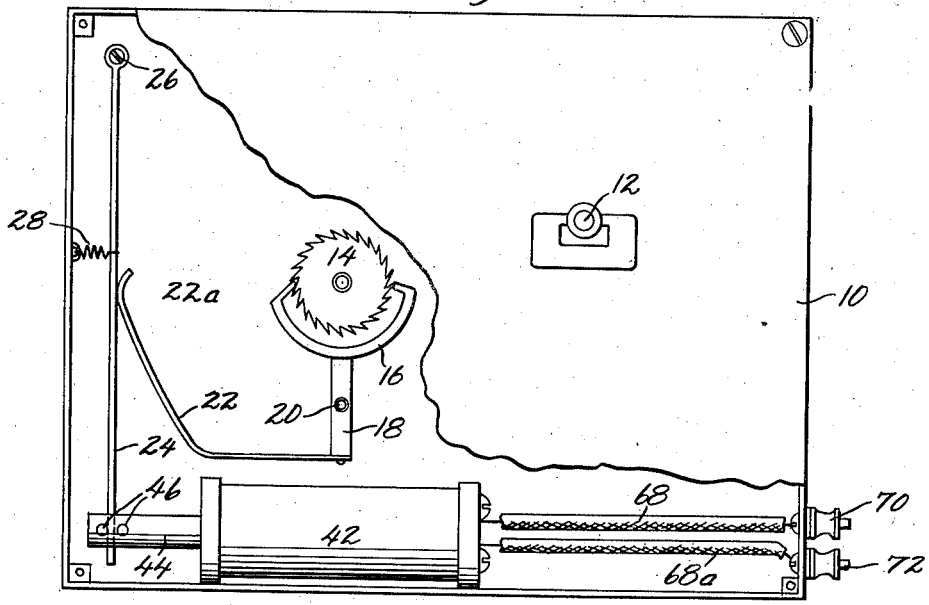
Figure 2 is a rear side elevation of the meter or register casing, with a portion of its rear wall broken away to show the electromagnetic means for controlling the operation of the metering or registering mechanism, housed within the casing.

Referring to the drawings, wherein like characters of reference denote corresponding parts in the several views, and more particularly to Figures 1 and 2, the meter or register, as it is exemplified therein, is comprised in a casing 10, housing the coil spring powered works of a clock, the spring winding stem of which is indicated at 12, the escape-wheel at 14, and the detent at 16. The detent 16 is carried at one end of a short lever 18, which is pivoted medially of its length, as at 20. The other end of the lever 18 carries an angled arm 22, of flat spring steel or the like, the arm being secured at one of its ends to the lever and has its other end bearing against a bar 24, the latter end of the arm being slightly curved, as at 22a, for rocking contact with the opposed side of the bar.

Preferably, the bar 24 is vertically disposed and pivoted at its upper end, as at 26, for rocking motion, when actuated to cause the detent 16 to control the required step-by-step motion of the escape-wheel 14; the bar thus replacing the usual flywheel or other element that would cause the clock-works to function. A spring element 28, preferably in the form of a spring coil, has one end fixed to the adjacent wall of the casing 10 and its other end to the bar 24, to hold the latter at its normal position of rest.

Mounted on the forwardly directed end of a shaft of the clock-works, preferably the minute hand shaft thereof, which end is projected through the front wall of the casing 10, is an index or pointer 32, that is cooperative with a dial card 34, positioned on the casing wall in centered relation with respect to the shaft end. An annular cover frame 36, having a transparent insert constituting a sight window, is hinged to the front wall of the casing 10, as at 38, to give protection to the dial card and the index or pointer, and a latch means 40 is provided opposite from the hinge 38 to secure the cover in its closed position.

As illustrated in Figure 1, the dial card 34 is provided with three concentric scales of graduations on its face, the inner of the scales being read for the fuel consumption of one stoker, the intermediate scale for that of two stokers, and the outer scale for that of three stokers; it being understood that, when more than one stoker is used in actual operational practice, they are set to start and stop simultaneously. Thus, with the index or pointer at the position shown, the dial card reading is 800 pounds of fuel used by the first stoker, 1600 pounds for the two, and 2400 pounds for the three. It is contemplated to have the dial card thus calibrated for the meter to register up to a maximum of 3,800 pounds for the first stoker, 7,600 pounds for the second, and 12,400 pounds for the third, which calibration is for the use of the meter in conjunction with stokers of the "Iron Fireman" type, hence, the dials will be differently calibrated for different makes of stokers and interchangeable with one another on the shaft 30, the index or pointer 32 being removed and replaced to that end.

For the actuation of the bar 24, an electromagnet 42, preferably of solenoid type, is mounted within the casing 10 on the bottom wall thereof and has a projecting end of its movable core 44 provided with a pair of horizontally spaced lugs or pins 46, between which the lower end of the bar is engaged. Thus, whenever the solenoidal coil is energized, or de-energized, by a make and break contactor, as will be presently explained, the bar is rocked on its pivot 26 and actuates the detent 16, through the medium of the angled arm 22, for the operation of the escape-wheel 14 and, consequently, of the clock-works, when the index or pointer 32 will be moved step-by-step relatively to the dial card 34.

Figure 5:
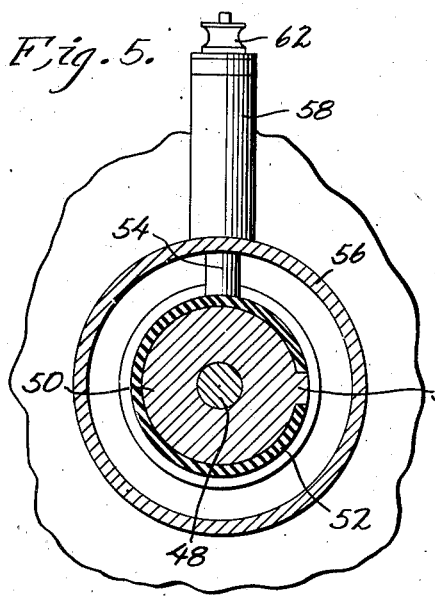
Figure 5 is a vertical, transverse section, taken through the line 5—5 on Figure 3; and, Figure 6 is a vertical, longitudinal section, taken through the line 6—6 on Figure 3.
Figure 6:
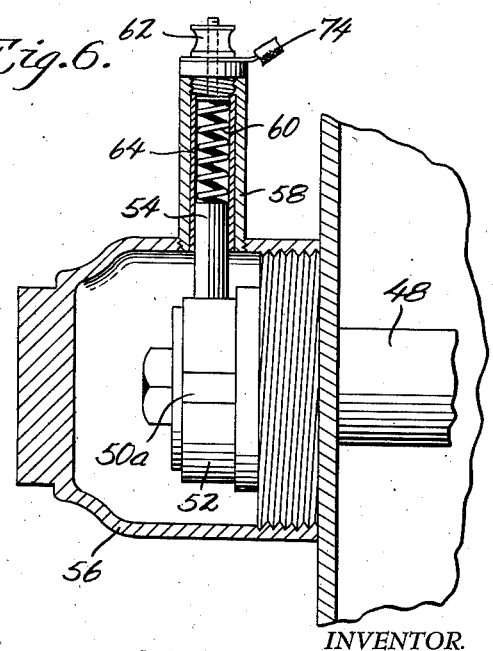

To adapt a stoker of the type specified herein for the use of the instant metering device therewith, one end of the stoker shaft 48 (Figures 5 and 6) is tight-fitted with a metal collar 50, of copper or the like, and this, in turn, is tight-fitted with a split band 52, of an insulating material such as hard rubber or the like; the collar 50 having a peripheral lug 50a fitted between the split ends of the band for the wiping contact therewith of a brush 54, of carbon or the like. This end of the stoker shaft 48 is enclosed within a protective cylindrical housing 56, extending radially from which is a tubular housing 58, of an insulating material, for the contact brush 54, the latter being tensioned by a coiled spring 60, within the housing 58. A binding post 62 is secured in the upper end of the tubular housing 58 and is in electrical connection with the contact brush 54, through the medium of a tubular metal insert 64, tight-fitted within the tubular housing.

In the installation of the metering device, the solenoid is preferably to be operated on a low voltage electrical power supply, say, 12 volts, to be derived from a step-down transformer 66, which will have its primary winding connected across a usual commercial power line, the circuit connections being as follows: Leads from the opposite ends of the coil of the solenoid 42, indicated at 68 and 68a (Figure 2) will connect with terminals 70 and 72, respectively, mounted exteriorly of an end wall of the casing 10. A lead 74 will extend from the terminal 70 and connect the binding post 62 on the stoker and a lead 76, from the terminal 72, will extend to and connect one side of the secondardy winding S, of the transformer 48, the other side of the latter being connected by a lead 78 to the frame of the stoker.

In operation, with the metering device installed in the stated manner and located at any place convenient for the operator of a stoker, or stokers, to keep a time period check on the amount of fuel consumed and the amount still available for use, the index or pointer 32 will be set at zero on the dial card 34, whenever the stoker hopper, or hoppers, is filled. Upon the placing of the stoker, or stokers, in operation, the circuit on the solenoid 42 is made and broken during each revolution of the stoker shaft, or shafts 48, causing the movable armature or core 44 to intermittently rock the bar 24, the motion of which is transferred to the detent 16, through the medium of the angled arm 22, and, through the escape-wheel 14, to the clock-works and the index or pointer 32.

The calibration of the dial card for use with the "Iron Fireman" stoker was reached in the following way: The hopper (not shown) of the stoker, which holds 1,200 pounds of coal, was filled and the metering device connected up in the manner before stated herein, with the index or pointer 32 set at the zero reading on the dial card. When the hopper was emptied, the stoker was stopped and the position of the index or pointer noted and marked on the face of the dial card. The distance between the zero graduation and the point where the index or pointer stopped was then divided into 12 equal parts and radial lines drawn through each division point, thus, each division of the inner of the graduated scales is representative of 100 pounds of coal, while each division of the intermediate scale is representative of 200 pounds and those of the outer scale 300 pounds.

Having thus fully described a practical embodiment of my invention and an exemplary application thereof, it is to be understood that the words which I have used are words of description rather than of limitation, and that changes within the purview of the appended claim may be made without departing from the true scope and spirit of my invention in its broader aspects.

What I claim is:

In an electric impulse operated step by step indicator, a dial, a pointer mounted to travel over the dial, an escapement positioned to actuate the pointer, said escapement including a ratchet, an arm pivotally mounting the ratchet of the escapement, a vertically disposed lever positioned adjacent the escapement, a suitable casing in which the elements are mounted and on the face of which the dial is positioned, a pin in the casing on which the lever is pivotally suspended from the upper end thereof, a spring bar carried by the arm of the escapement ratchet positioned with the free end thereof in contacting relation with the lever and diagonally disposed in relation thereto, a spring with one end connected to the lever and the other to the casing urging the lever away from the said spring bar, a solenoid having an extending core positioned in the casing with the extending end of the core adjacent the free end of the lever, and means connecting the lower free end of the lever to the extending end of the core wherein energization of the solenoid actuates the lever and escapement to move the pointer one step.

MARSHALL E. BUTLER.

REFERENCES CITED

The following references are of record in the file of this patent:

UNITED STATES PATENTS

| Number | Name | Date |
| --- | --- | --- |
| 510,457 | Whitehall | Dec. 12, 1893 |
| 1,301,585 | Maxson | Apr. 22, 1919 |

FOREIGN PATENTS

| Number | Country | Date |
| --- | --- | --- |
| 401,951 | Great Britain | Nov. 23, 1933 |